United States Patent
Lee et al.

(10) Patent No.: US 11,626,030 B2
(45) Date of Patent: Apr. 11, 2023

(54) APPARATUS AND METHOD FOR ELICITING OPTIMAL STRATEGY OF THE HUMANS IN THE INTERACTIVE GAMES USING ARTIFICIAL INTELLIGENCE

(71) Applicant: Korea Advanced Institute of Science and Technology, Daejeon (KR)

(72) Inventors: Sang Wan Lee, Daejeon (KR); JeeHang Lee, Daejeon (KR); SangHyun Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 410 days.

(21) Appl. No.: 16/381,954

(22) Filed: Apr. 11, 2019

(65) Prior Publication Data
US 2020/0043359 A1 Feb. 6, 2020

(30) Foreign Application Priority Data
Jul. 31, 2018 (KR) ........................ 10-2018-0089185

(51) Int. Cl.
G09B 19/00 (2006.01)
G06N 20/00 (2019.01)
G07F 17/32 (2006.01)

(52) U.S. Cl.
CPC ............ *G09B 19/00* (2013.01); *G06N 20/00* (2019.01); *G07F 17/3262* (2013.01)

(58) Field of Classification Search
CPC ...... G09B 19/00; G06N 20/00; G07F 17/3262
See application file for complete search history.

(56) References Cited

U.S. PATENT DOCUMENTS

| | | | | |
|---|---|---|---|---|
| 9,807,725 B1* | 10/2017 | Vitus | ........................ | H04W 4/02 |
| 2006/0195409 A1* | 8/2006 | Sabe | .................. | G05B 13/0265 |
| | | | | 706/16 |
| 2016/0077547 A1* | 3/2016 | Aimone | ................ | A61B 5/1114 |
| | | | | 345/8 |

FOREIGN PATENT DOCUMENTS

KR 10-2010-0119233 A 11/2010

OTHER PUBLICATIONS https://www.jneurosci.org/content/36/5/1529 "Goal-Directed decision making with spiking neurons", Johannes Friedrich and Mate Lengyel Journal of Neuroscience Feb. 3, 2016.*
https://www.jneurosci.org/content/36/5/1529 "Goal-Directed decision making with spiking neurons", Johannes Friedrich and Mate Lengyel "Friedrich" Journal of Neuroscience Feb. 3, 2016 (Year: 2016).*
Korean Office Action issued in corresponding Korean Application No. 10-2018-0089185 dated Nov. 25, 2019, four (4) pages.

* cited by examiner

*Primary Examiner* — Sherrod L Keaton
(74) *Attorney, Agent, or Firm* — Burns & Levinson, LLP; Joseph M. Maraia

(57) ABSTRACT

Disclosed is a strategy guide method performed by an artificial intelligence (AI)-based strategy guide system, the method including generating an environment that interacts with a user; and controlling a strategy of the user based on a preset multi-objectives by changing the environment in response to observing a decision making of the user in the environment.

18 Claims, 7 Drawing Sheets

APPARATUS AND METHOD FOR ELICITING OPTIMAL STRATEGY OF THE HUMANS IN THE INTERACTIVE GAMES USING ARTIFICIAL INTELLIGENCE

CROSS-REFERENCE TO RELATED APPLICATION

This application claims the priority benefit of Korean Patent Application No. 10-2018-0089185, filed on Jul. 31, 2018, in the Korean Intellectual Property Office, the disclosure of which is incorporated herein by reference.

BACKGROUND

1. Field of the Invention

The following description of example embodiments relates to a system and method for inducing a strategy using artificial intelligence (AI) in a situation in which a human, for example, a user and a computer interact.

2. Description of the Related Art

The application range of current artificial intelligence (AI) technology has been expanded to providing adaptive services as a human companion beyond typical robot control or strategy search. In general, such general technology aims to set an environment in which a computer corresponds to an AI agent and a user interacts with the AI agent and to enable the computer to maximize a reward value based on a satisfaction of the user.

According to a computer-oriented paradigm, the computer corresponding to the AI agent observes the user, for example, the environment, and infers, plans, and finally determines most satisfiable information and/or service for the user, and provides the determined information and/or service to the user. Here a state and satisfaction of the user may vary based on the information/service provided from the computer. Through the aforementioned procedure, the computer receives a maximum reward when the state and satisfaction of the user reaches a maximum value. Here, the computer is configured to provide convenience to the user with a single objective. Accordingly, the computer observes the user to achieve the sole objective, and a task of the computer is terminated when a state of the user reaches the goal state described in the objective of the computer. For example, in a game environment, systems based on the computer-oriented paradigm enable the computer to observe a level of achievement of the user in a game as a part of an environmental state, and to provide a game strategy in an appropriate form as an advice or to dynamically reconfigure a driving environment, for example, a layout and a user interface, to accomplish the single objective, for example, user achievement maximization.

As described above, the computer-oriented paradigm could be a means to maximize the user's satisfaction. The computer may enhance a user efficiency by performing a direct intervention for the behavior change of the user at a behavioral level as a contents manager controlled by AI or autonomous agents. The user may achieve a specific level of satisfaction by passively performing recipes in the intervention process provided from the AI as a part of an AI control environment. This approach may not significantly improve the achievement and satisfaction of the user for the game, because some effects depend on changes in the mind, the attitude, and states of the user that frequently occur. The computer reacts to an environment based on a game output. Therefore, when the computer continuously intervenes without understanding a situation of the user in which such changes are progressed, the computer may interrupt the user that learns the game. Accordingly, the purpose of the computer may not be accomplished and the experience of the user for the game may be regressed.

SUMMARY

At least one example embodiment provides an artificial intelligence (AI)-based strategy guide method and system that enables a game environment control agent to control experience of a user learning an environment, in the environment in which the user and the game environment control agent interact.

At least one example embodiment also provides an AI-based strategy guide method and system that enables a computer to manipulate an environment to optimize experience of a user toward a desired state, to control a prediction error of the user at a level of basal-gangliato meet various objectives, and to induce a specific behavior, that is, action, of the user, based on an aspect that the user makes a decision based on reward prediction error and state prediction error observed at the level of basal-ganglia according to previous experiences.

According to an aspect of at least one example embodiment, there is provided a strategy guide method performed by an AI-based strategy guide system, the method including generating an environment that interacts with a user; and controlling a strategy of the user based on a preset multi-objectives by changing the environment in response to observing a decision making of the user in the environment.

The controlling of the strategy of the user may include determining an environmental change based on the decision making of the user observed in the environment and changing the environment to manipulate a prediction error for achieving a goal of the user.

The controlling of the strategy of the user may include setting an objective function about a reinforcement learning signal and characteristic observed in basal ganglia of the user and predicting the prediction error that includes a reward prediction error of the user and a state prediction error of the user.

The controlling of the strategy of the user may include detecting the environmental change based on the decision making of the user observed in the environment.

The controlling of the strategy of the user may include performing a strategy for achieving the goal of the user in the environment that is changed in response to detecting the environmental change, and determining whether the prediction error according to the performed strategy satisfies the objective function.

The controlling of the strategy of the user may include terminating a process in response to the prediction error of the user satisfying the objective function, and verifying a current environmental state and the prediction error state of the user in response to the prediction error of the user not satisfying the objective function, and changing an environmental setting for inducing a strategy required in the verified current environmental state.

The controlling of the strategy of the user may include determining whether the decision making of the user satisfies the objective function in response to not detecting the environmental change, and terminating a process in response to the decision making of the user satisfying the objective function, and changing an environmental setting for inducing a strategy required in the environment in response to the decision making of the user not satisfying the objective function.

According to an aspect of at least one example embodiment, there is provided a strategy guide system using AI, the strategy guide system including an environment generator configured to generate an environment that interacts with a user; and a strategy controller configured to control a strategy of the user based on a preset multi-objectives by changing the environment in response to observing a decision making of the user in the environment.

The strategy controller may be configured to determine an environmental change based on the decision making of the user observed in the environment and to change the environment to manipulate a prediction error for achieving a goal of the user.

The strategy controller may be configured to set an objective function about a reinforcement learning signal and characteristic observed in basal ganglia of the user and to predict the prediction error that includes a reward prediction error of the user and a state prediction error of the user.

The strategy controller may be configured to detect the environmental change based on the decision making of the user in the environment.

The strategy controller may be configured to perform a strategy for achieving the goal of the user in the environment that is changed in response to detecting the environmental change, and to determine whether the prediction error according to the performed strategy satisfies the objective function.

The strategy controller may be configured to terminate a process in response to the prediction error of the user satisfying the objective function, and to verify a current environmental state and the prediction error state of the user in response to the prediction error of the user not satisfying the objective function, and to change an environmental setting for inducing a strategy required in the verified current environmental state.

The strategy controller may be configured to determine whether the decision making of the user satisfies the objective function in response to not detecting the environmental change, and to terminate a process in response to the decision making of the user satisfying the objective function, and to change an environmental setting for inducing a strategy required in the environment in response to the prediction error of the user not satisfying the objective function.

A strategy guide system according to example embodiment may be applied to a learning situation in which a user and a computer interact using AI and may control an environment to achieve a goal set to the computer based on performance, previous actions, and current intent of the user.

Also, a strategy guide system according to example embodiments may be applied to a specific environment, for example, an online game, a slot machine for adult, and a large-scale military operation, and may induce a game strategy and performance of the user suitable for a situation and a purpose in a game by controlling the environment based on performance, pervious actions, and current intent of the user.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
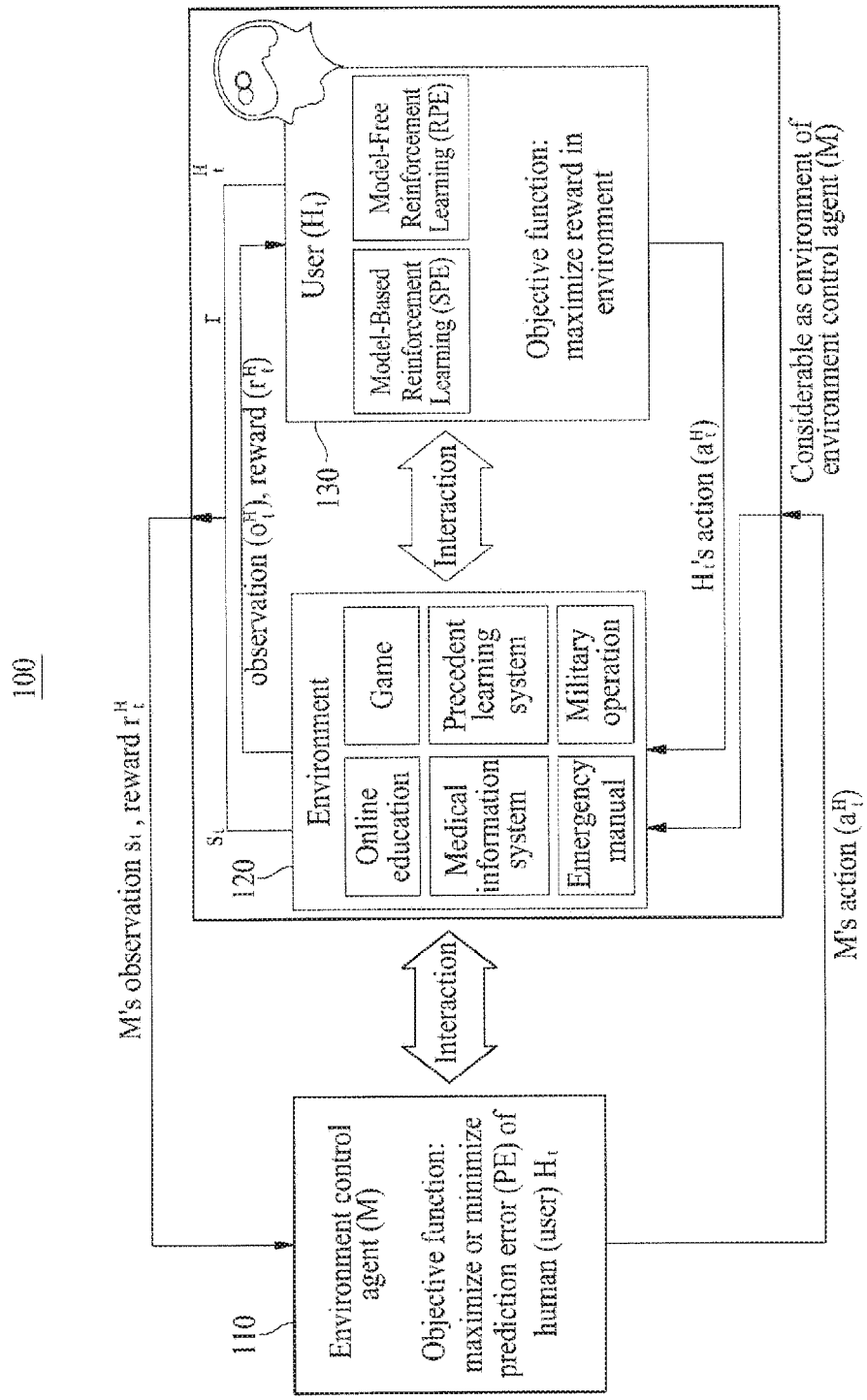
FIG. 1 illustrates an operation of a strategy guide system according to an example embodiment.

One or more example embodiments will be described with reference to the accompanying drawings. Advantages and features of the example embodiments, and methods for achieving the same may become explicit by referring to the accompanying drawings and the following example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

When an element or a layer is referred to as being "on," "connected to," "coupled to," or "adjacent to," another element or layer, the element or the layer may be directly on, connected to, coupled to, or adjacent to, the other element or layer, or one or more other intervening elements or layers may be present. In contrast, when an element or a layer is referred to as being "directly on," "directly connected to," "directly coupled to," or "immediately adjacent to," another element or layer, there are no intervening elements or layers present.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Hereinafter, example embodiments will be described with reference to the accompanying drawings.

FIG. 1 illustrates an operation of a strategy guide system according to an example embodiment.

Referring to FIG. 1, a strategy guide system 100 may include an environment 120, a user 130 configured to observe a portion of the environment 120 and to interact with the environment 120, and an environment control agent 110 configured to control the environment 120 while observing an interaction state between the user 130 and the environment 120. Here, the environment control agent 110 may quantify an estimated reinforcement learning hidden signal, for example, a reward prediction error and a state prediction error, of the user 130 and may learn an optimal environment control strategy. Here, the strategy guide system 100 may operate in each computer that interacts with the user 130, and may also operate as a separate server system.

The strategy guide system 100 may refer to an artificial intelligence (AI)-based strategy guide system operating based on a circulation logic that the environment control agent 110 learns the environment 120 in the environment 120 in which the user 130 and the environment control agent 110.

The strategy guide system 100 may perform an AI-based strategy guide to optimize user experience. The user 130 may observe the environment 120 and environment observation information. Here, the environment control agent 110 may observe all the environmental states. Here, the environment control agent 110 may control the user experience represented as a state of the user 130 based on a desired scenario.

Since the environment control agent 110 may control the environment 120 based on an interaction state between the user 130 and the environment control agent 110, the user experience may be guided without directive intervention into the user 130. Accordingly, the strategy guide system 100 may control the user experience of the user 130 learning the environment 120 through the environment control agent 110 and may provide a bidirectional interaction technology as a multi-purpose mechanism capable of variously inducing, for example, guiding the user experience.

Even without direct intervention from the environment 120, the user 130 may continuously interact with the environment 120 that is changed under control of environment control agent 110. The user 130 may interact with the environment 120 to perform a task and may continuously seek a goal to be achieved in the environment 120 while performing an action required to achieve a goal under the environment 120 set by the environment control agent 110. The user 130 may perform an action requested by the environment 120, which may lead to inducing a behavioral strategy by the environment 120.

The environment control agent 110 may observe an interaction between the user 130 and the environment 120 in terms of changes in a learning state of the user 130, a strategy mechanism state, and a continuous environmental state, and may change an environmental state to induce a strategy required in a current environment based on a level of satisfaction and achievement of the user 130.

Once the environment 120 is changed by the environment control agent 110, the user 130 may perform an action most suitable for a current situation to continuously accomplish a goal in a changed environmental state. Here, an action performed by the user 130 in a current situation may be a strategy intended by the environment control agent 110. Whether the action is the strategy intended by the environment control agent 110 may be verified through observation.

When the action of the user 130 is not the intended strategy, the environment control agent 110 may set an environmental state to be further strongly induced or may set the environmental state to be indirectly induced. On the contrary, when the action of the user 130 is the intended strategy, the environment control agent 110 may change the environmental state to maximize a desired goal.

In general, the user 130 may have a goal of maximizing the satisfaction of the user 130 and the environment control agent 110 may perform an action with a multi-objectives. For example, the environment control agent 110 may change the environment 120 to maximize a specific action of the user 130 and may set the environment 120 to remove a specific strategy. Alternatively, the environment control agent 110 may change the environment 120 to simultaneously achieve multiple goals. The environment control agent 110 may set the environment 120 with a purpose of reinforcing specific type of actions among such various actions and simultaneously removing other actions.

During this process, the user 130 may optimize a level of satisfaction in the changing environment 120 and may develop the optimal action or strategy. At the same time, the environment control agent 110 may developmentally perform the optimal action for setting the environment 120 in which a specific action is induced. Thus, resonance between a human and AI may be realized.

In a specific time t, the environment control agent 110 may perform an action of manipulating the environment 120 based on a policy $\pi_M(a_t^M|s_t)$ and may generate a new environmental state $s_{t+0.5}=f(s_t, a_t^M)$. The user 130 may perform an action in an environment generated based on a policy $\pi_{H_t}(a_{t+0.5}^H|o_{t+0.5})$, may generate a new environmental state $s_{t+1}=f(s_{t+0.5}, a_{t+0.5}^H)$, and may receive a reward $r_t^H$ according to thereto.

The environment control agent 110 may receive a reward $r_t^M$ after the user 130 performs the action. Here, the reward (value) $r_t^M$ acquired by the environment control agent 110 depends on a state of the user 130 and a learning state of the user 130 may be induced based on a scenario preset during in which the environment control agent 110 maximizes the reward $r_t^M$ of the environment control agent 110. Such interactions may be iterated in a time t+1.

As described above, the strategy guide system 100 is based on a mechanism of a brain-inspired decision making system. The recent study of decision neuroscience shows that decision making of humans is the mixture of model-free reinforcement learning and model-based reinforcement learning, and a human makes a decision driven by a reward prediction error (RPE) and a state prediction error (SPE). Here, the model-free reinforcement learning relates to learning an action or a strategy through a lot of experience and indicates that, in the case of performing a certain action, learning is performed based on a reward corresponding to the action. Here, a signal generated according thereto is a reward prediction error (RPE). The reward prediction error plays an important role in building a habitual behavior that is an optimal policy consisting of a series of actions pursuing the highest reward in the end. The optimal policy learned through the model-free reinforcement learning may be very quickly activated if the same situation occurs. However, if the situation rapidly changes, the habitual action (strategy) may not be valid anymore and thus, may not be appropriate to achieve a goal.

The model-based reinforcement learning is engaged in a goal-directed behavior; it first quickly acquires an environmental states of the agent and then establishing an optimal policy for most quickly maximizing a reward in a current environment and performing an action. Here, a signal generated according thereto is a state prediction error (SPE). Although a relatively great amount of cognitive load is required for this learning strategy in the human brain, the learning strategy may effectively and robustly cope with a quickly changing environment during a relatively short period of time.

According to an example embodiment, considering that a decision of the user is made based on a previously experienced reward prediction error and state prediction error, a strategy guide system may induce a prediction error such that a computer manipulates an environment suitable for various purposes to maximize the experience of the user toward a desired direction.

An objective function of AI may indicate an approach to a prediction error suitable for an action of a user desired to be guided in a current environment. The objective function of AI may be defined as follows. The decision making of the user follows a reinforcement learning process. This process is generally defined as the following Bellman's principle of optimality.

$$Q*(s, a) = \underbrace{\sum_{s'} \underbrace{P(s, a, s')}_{\text{state}} \underbrace{[R + \gamma \max_{a'} Q*(s', a')]}_{\text{reward ("TD target")}}}_{\text{value}}$$

According to the above arrangement, the decision making of the user has tendency of selecting an action capable of acquiring a highest value ($Q*(s, a)$ part). This value is proportional to a reward that a human may currently receive.

To maximize the reward, the human needs to accurately verify two sorts of information. First, information on the reward, that is, a reward ("TD target") part, is important to verify a maximum reward value and an/decision that triggers the reward. Second, a current environmental state of the user, that is, a state part, provides important information regarding how to track an environment to acquire a maximum reward and achieve a goal.

Accordingly, it is very important to predict a reward and to predict a current environmental state in terms of decision making of the user. Signals for the above two predictions are discovered in the brain. A reward prediction error (RPE) is discovered in a dopamine system and a state prediction error (SPE) is discovered in a lateral prefrontal cortex.

According to an example embodiment, adjusting a reward prediction error and a state prediction error of a user may be used as the objective function. That is, it is an aim to guide a current reward prediction error and state prediction error of the user in such a manner manipulating user's behavior in relation to those prediction errors in the currently interacting environment, for example, a game environment.

A model that defines the reward prediction error may be represented as follows:

$$\delta_{RPE} = r'(s') + \gamma Q_{MF}(s',a') - Q_{MF}(s, a) \quad \text{[Equation 1]}$$

Here, s denotes a current state, s' denotes a next state, a denotes user's action in the current state s, and a' denotes user's action in the next state s'. Also, r'(s') denotes a size of a reward obtained by the user in the next state s' and γ denotes a discounted factor determining that, when a reward corresponding to the user action is received at a time interval, the size of the reward decreases based on the time difference. Further, as value information, $Q_{MF}(s', a')$ denote a value acquirable when the user performs the user action a' in the next state s' and $Q_{MF}(s, a)$ denotes a value acquirable when the user performs the user action a in the current state a.

Accordingly, the objective function f for the reward prediction error could be defined as follows:

To activate model-free RL of human user→minimize the reward prediction error→Min($\delta_{RPE}$)≤$RPE_{min}$ To suppress the model-free RL of human user→maximize the reward prediction error→Max($\delta_{RPE}$)≥$RPE_{max}$ Also, a model that defines the state prediction error may be represented as follows:

$$\delta_{SPE} = 1 - T(s,a,s') \quad \text{[Equation 2]}$$

Here, T(s, a, s') includes a state transition probability as a state transition matrix. That is, it indicates a probability that when the user performs the action a in the current state s, the user may move to the next state s'. The objective function for the state prediction error may be defined as follows:

To activate model-based RL of human user →minimize the state prediction error→Max($\delta_{SPE}$)=0

To suppress the model-based RL of human user→maximize the state prediction error→Max($\delta_{SPE}$)=1

All of the reward prediction error and the state prediction error are prediction errors. Thus, when they have a value less than a preset threshold value, it indicates that a decision making accuracy is relatively high. In contrast, when they have a value greater than the preset threshold value, it indicates that the decision making accuracy for a strategy is relatively low. For example, in the case of the state prediction error, if a state prediction error value is 0, it indicates that the decision making for any strategy is accurate at all times and, on the contrary, if the state prediction error value is 1, it indicates that the decision making for any strategy is wrong at all times.

The strategy guide system may induce a strategy by controlling the user experience itself by using signals and features observed in the basal ganglia to verify a state, a behavioral strategy, and a goal of the user in a user-computer interacting situation and by using the same signals and features observed from the user as a reference for the computer to induce a specific action or strategy of the user. That is, the strategy guide system may induce a strategy of the user, that is, guide the user to the strategy by manipulating an environment when the user is in a game environment and accordingly, may control prediction errors including the reward prediction error and the state prediction error at a brain level.

Figure 2:
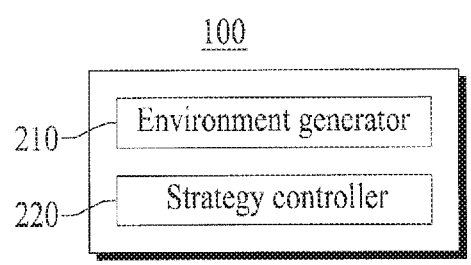
FIG. 2 is a block diagram illustrating a configuration of a strategy guide system according to an example embodiment.
Figure 3:
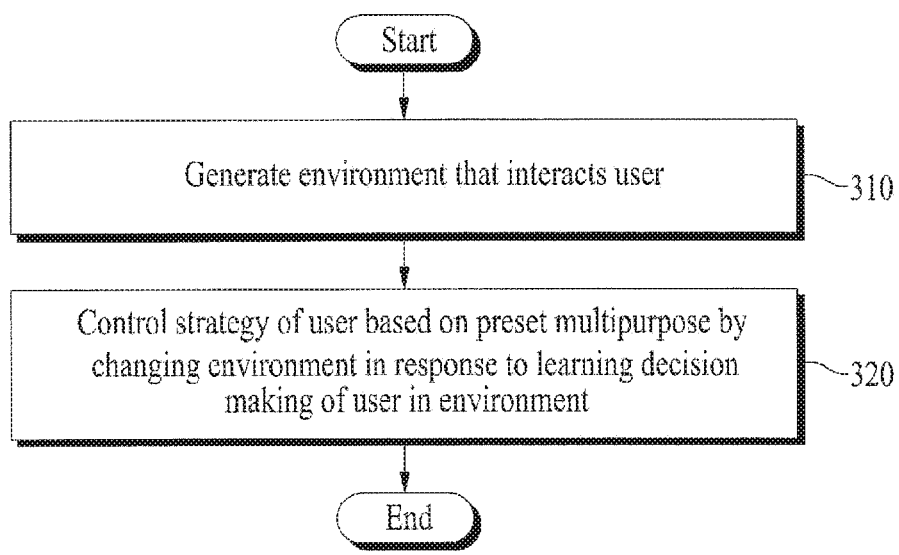
FIG. 3 is a flowchart illustrating a strategy guide method performed by a strategy guide system according to an example embodiment.

FIG. 2 is a block diagram illustrating a configuration of a strategy guide system according to an example embodiment, and FIG. 3 is a flowchart illustrating a strategy guide method performed by a strategy guide system according to an example embodiment.

Referring to FIG. 2, a processor of the strategy guide system 100 may include an environment generator 210 and a strategy controller 220. The components may be representations of different functions performed by the processor in response to a control instruction provided from a program code stored in the strategy guide system 100. The components may control the strategy guide system 100 to perform operations 310 and 320 included in the strategy guide method of FIG. 3. Here, the components may be configured to execute an instruction in response to a code of at least one program and a code of an operating system (OS) included in a memory.

The processor may load a program code stored in a file of a program for the strategy guide method. For example, when the program is executed at the strategy guide system 100, the processor may control the strategy guide system 100 to load the program code from the file of the program to the memory under control of the OS. Here, the processor and the environment generator 210 and the strategy controller 220 included in the processor may be differential functional representations of the processor to perform operations 310 and 320 by executing an instruction of a corresponding portion in the program code loaded to the memory.

Referring to FIG. 3, in operation 310, the environment generator 210 may generate an environment that interacts with a user.

Figure 4:
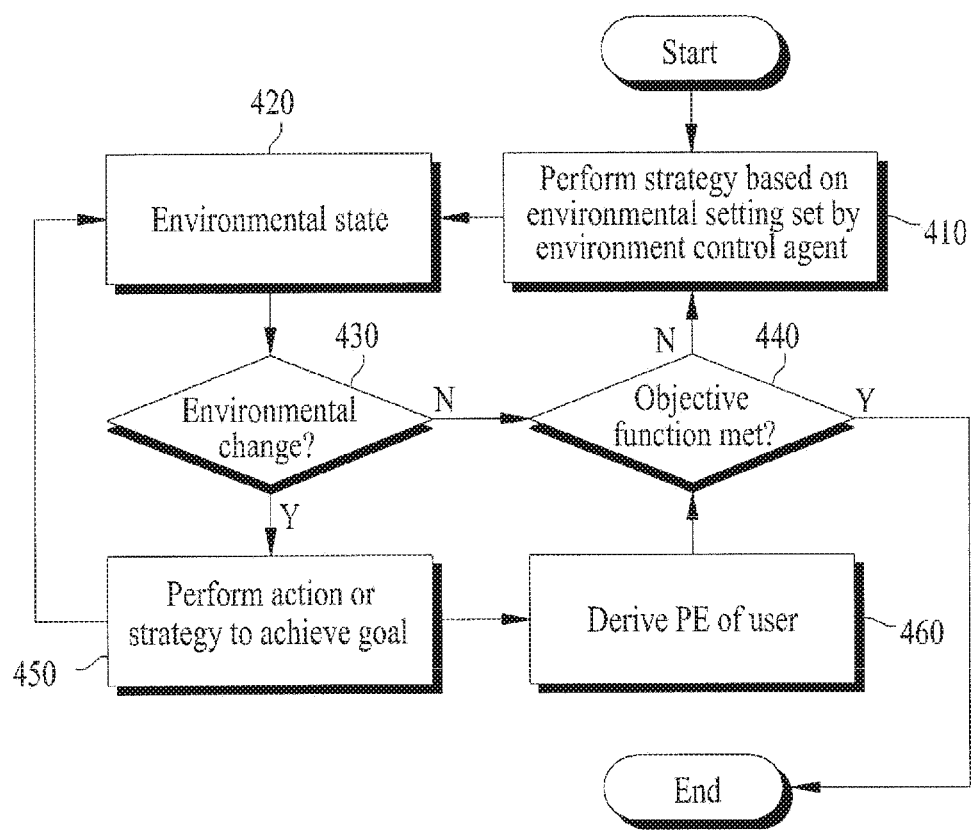
FIG. 4 is a flowchart illustrating a method of controlling a strategy of a user in a strategy guide system according to an example embodiment.

In operation 320, the strategy controller 220 may control a strategy of the user based on a preset multi-objectives by changing the environment in response to learning a decision making of the user in the environment. Here, the decision making of the user may include an action performed by the user. FIG. 4 is a flowchart illustrating a method of controlling a strategy of a user according to an example embodiment. Referring to FIG. 4, in operation 410, the strategy guide system may perform a strategy based on an environmental setting set by an environment control agent. The strategy guide system may generate the environment based on the environmental setting of the environment control agent. When the user detects an environmental state of the environment in operation 420, the user may perform a goal achievement strategy to perform a specific task in the environment. The user may continuously seek a purpose to be achieved in the environment while performing an action to achieve the goal in the environment. As described above, a plurality of actions of the user may change the environmental state. In operation 430, the strategy guide system may determine whether the environment is changed. In operation 450, the user may perform an action or a strategy to achieve the goal.

When the environmental change is detected, the user may perform the action to achieve the goal and, in response thereto, a prediction error (PE) of the user may be derived in operation 460. Here, the strategy guide system may determine whether the prediction error of the user meets, that is, satisfies an objective function of the environment control agent m operation 440. Once the environment is changed, the user may perform an action most suitable for a current situation in order to continuously achieve a goal in the changed environment. Here, whether the action of the user is a strategy intended by the environment control agent may be observed through the environment. When the prediction error of the user does not satisfy the objective function of the environment control agent, the environment control agent may verify the prediction error state of the user and the environmental state and may change the environmental state to induce a strategy for the current environment from the user. For example, when the strategy required for the current environment is not induced from the user, the environment control agent may set the environmental state to further strongly induce the strategy or may set the environmental state to indirectly induce the strategy. On the contrary, when the strategy required for the current environment is induced from the user, the environment control agent may change the environmental state to maximize the same based on the preset goal.

Also, when the environmental change is not detected, the strategy guide system may determine whether the decision making of the user satisfies the objective function. When the decision making of the user satisfies the objective function, the process is terminated. When the decision making of the user does not satisfy the objective function, the environment control agent may set the environmental setting to induce the strategy required for the environment.

Figure 5:
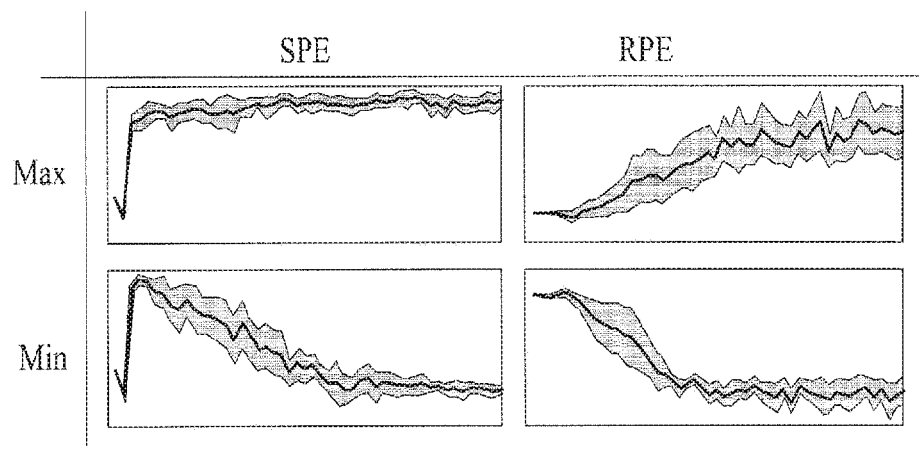
FIG. 5 illustrates graphs showing the transition of reward prediction error values and state prediction error values based on a scenario in which a strategy guide system separately manipulates each of a reward prediction error and a state prediction error according to an example embodiment.
Figure 6:
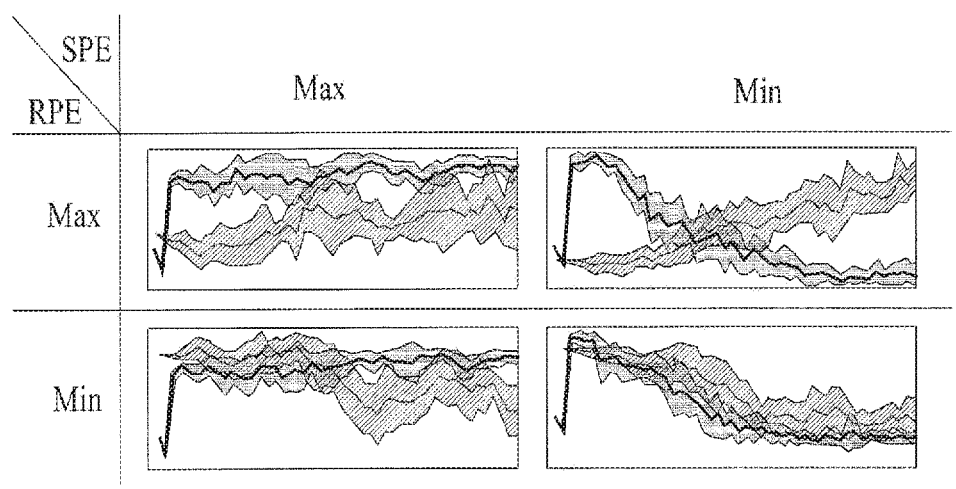
FIG. 6 illustrates graphs showing the transition of reward prediction error values and state prediction error values based on a scenario in which a strategy guide system simultaneously manipulates a reward prediction error and a state prediction error according to an example embodiment.

FIG. 5 illustrates graphs showing the transition of reward prediction error values and state prediction error values based on a scenario in which a strategy guide system separately manipulates each of a reward prediction error and a state prediction error according to an example embodiment, and FIG. 6 illustrates graphs showing the transition of reward prediction error values and state prediction error values based on a scenario in which a strategy guide system simultaneously manipulates a reward prediction error and a state prediction error according to an example embodiment.

For example, the strategy guide system may set a 2-stage Markov decision environment as an environment in which a user, for example, the user 130 of FIG. 1 and an environment control agent, for example, the environment control agent 110 of FIG. 1, interact. For example, the corresponding environment is based on a sequential decision making process proposed in Daw et al., 2011 and a single episode may be completed when the user performs an action 200 rounds.

On the side of the user, the corresponding environment may provide a total of nine observable states and two available actions. Here, the environment may be transited to a different state based on a transition probability in response to an action of the user. The user may receive a reward after performing an action twice.

On the side of the environment control agent, the corresponding environment may provide an environmental state including four items. For example, the environment may provide items including a state displayed for the user, a reward given to the user, an additional, value provided from the environment control agent in addition to a default value among rewards given to the user, and a transition probability of the state displayed for the user.

Also, the environment control agent may perform six actions to control the corresponding environment. For example, the actions may include an action of increasing or decreasing an additional value among rewards given to the user, an action of changing a correlation structure between a state in which the reward is given to the user 130 and a state in which the reward is not given, action of deterministically or probabilistically changing a transition probability between states displayed for the user 130, and an action of not performing an environment control.

Accordingly, interaction between the user and the environment control agent may proceed with respect to a total of eight scenarios. Referring to FIG. 5, the scenarios may include four cases, for example, a case of simultaneously maximizing or minimizing a state prediction error (SPE) and a reward prediction error (RPE), a case of maximizing the state prediction error and minimizing reward prediction error, and a case of minimizing the state prediction error and maximizing the reward prediction error.

Referring to FIGS. 5 and 6, it can be verified that the transition between the state prediction error and the reward prediction error varies according to a desired intention in each scenario. That is, it is possible to verify that a learning state of the user, for example, a virtual human agent, may be controlled according to a desired intention through the environment control agent.

As described above, it is possible to propose an environment control framework in which a computer controls experience of a user learning an environment and to verify the validity thereof through simulations. The environment control framework may apply to various fields of games and learnings and further expand to any next-generation AI paradigms that evolve through user cooperation.

Figure 7:
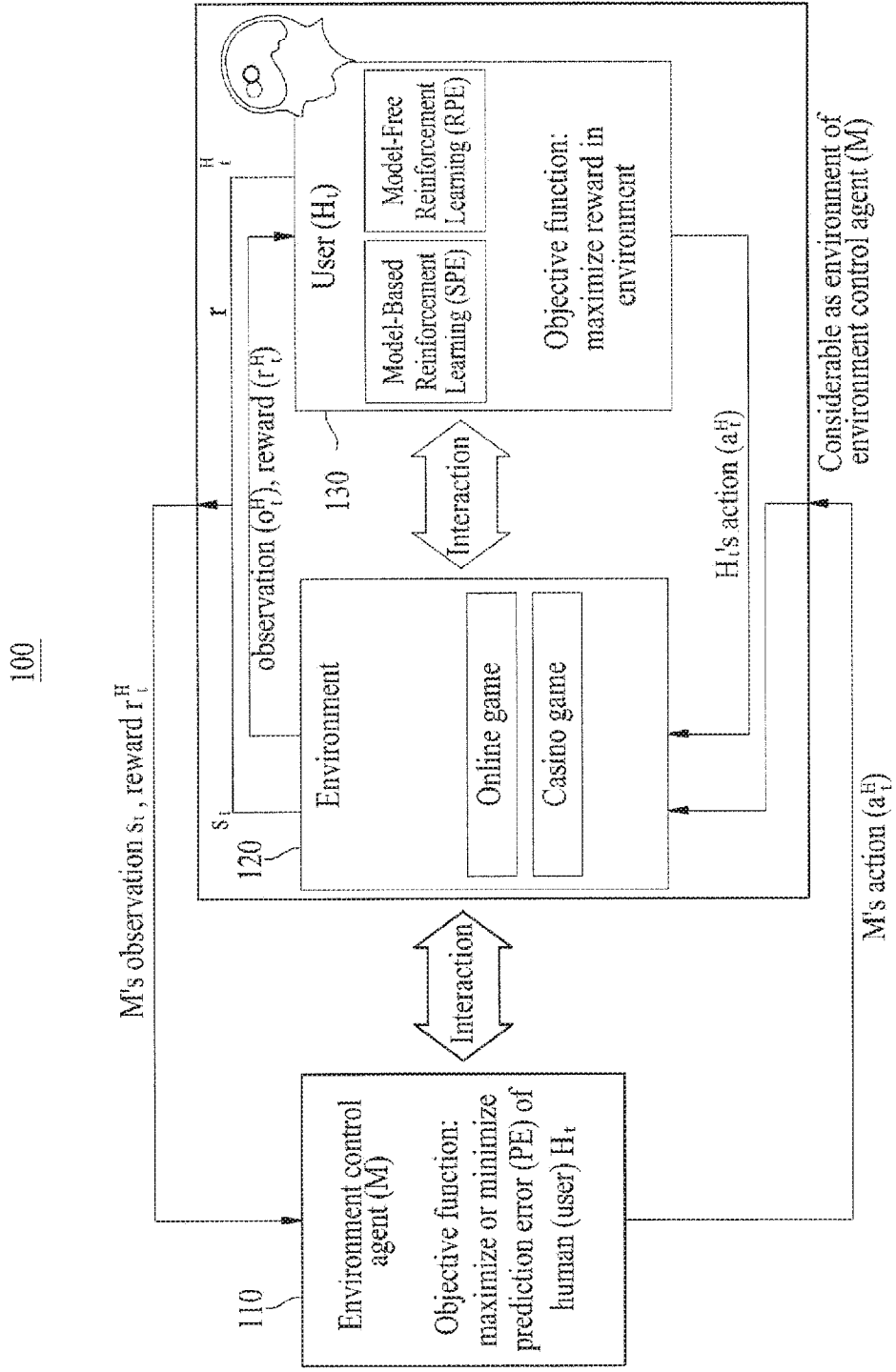
FIG. 7 is a diagram illustrating an operation of a strategy guide system that controls a strategy of a user in a game environment according to an example embodiment.

FIG. 7 is a diagram illustrating an operation of a strategy guide system that controls a strategy of a user in a game environment according to an example embodiment.

The strategy guide system 100 using AI may be applied to any environments 120 that interacts with the user 130. For example, the strategy guide system 100 may be applied to, for example, an online game, a slot machine for adult, a large-scale military operation, an online education, a medical information system, an emergency manual, and a precedent learning system, and, in addition thereto, may be applied to various environments. An example in which the environment 120 is an online game or a casino game environment will be described with reference to FIG. 7. In the online game environment, the strategy guide system 100 may be applied to a user interactive game engine.

For example, the user 130 may search and observe a current environment and may make a decision to achieve a goal and may also perform an action based on the made decision. In the case of an online game, the user 130 may acquire an item to accomplish a corresponding quest or may acquire a point and an item by attacking an opponent. Alternatively, in the case of a casino game, the user 130 may adjust a behavior pattern to receive further rewards.

The environment control agent 110 may verify the action performed by the user 130 after the user 130 makes a decision based on the goal and an environmental state changed by the action, and may change the environment 120 to manipulate an action prediction error of the user 130 for goal achievement. For example, in the case of the online game, the user 130 may acquire an item to achieve a quest or may acquire a point and an item by attacking an opponent. When the environment 120 is changed due to the action, the environment control agent 110 may verify the point of the user 130 and the environment change state and may change the environment 120 to induce a next action of the user 130. For example, to prevent the user 130 from leaving a game environment, the environment control agent 110 may control the environment 120 such that the user 130 may acquire a better result than a user prediction and continuously join a game for a goal. Alternatively, the environment control agent 110 may control the environment 120 such that a user prediction is wrong at all times and the user 130 loses an interest in a game and leaves the game environment. Alternatively, the environment control agent 110 may change the environment 120 to maximize a prediction error for a type of the user 130 enjoying adventures and thereby maximize fun the user 130 feels in the game. Alternatively, the environment control agent 110 may change the environment 120 to minimize the prediction error for a type of the user 130 enjoying a game in a less stressful environment and thereby maximize fun the user 130 feels in the game and make the user 130 continuously play the game.

In the case of the casino game, the user 130 may perform an action to be further accurate for a pattern of the game to receive more rewards. To make the user 130 invest a more amount in the game and to prevent the user 130 from leaving the game, the environment control agent 110 may manipulate a current state to be better than a state predicted by the user 130 and may control the environment 120 such that the user 130 may receive a slightly better reward than a user prediction. In this case, the user 130 may regard that a user decision is not bad and may continuously perform an action of playing the game and accordingly, may not leave the game. Alternatively, to make the user 130 immediately leave the game, the environment control agent 110 may manipulate a current state to be much worse than a state predicted by the user 130, and thereby induce a prediction error greater than a prediction error of the user 130. In this case, the user 130 may face a further worse situation than the user prediction. Accordingly, if the user 130 is robust against stress and is challenging, the user 130 may endlessly challenge with a better strategy to overcome the situation. Otherwise, the user 130 may give up playing the game.

The environment control agent 110 may observe an action of the user 130 and an environmental change caused by the action, and may manipulate the environment 120 based on a goal, for example, a prediction error maximization, a prediction error minimization, or a prediction error range of a specific section, of the environment control agent 110, and may indirectly guide the user 130 to perform an action corresponding to the environment 120.

A strategy guide system according to example embodiments may be configured in a form of an AI model and may be applied to a learning situation in which a user and a computer interact and may control an environment to achieve a purpose set to the computer based on performance, previous actions, and current intent of the user.

Also, a strategy guide system according to example embodiments may be applied to an online game, and may be configured in a server system that may induce a game strategy and performance of a user suitable for a situation and a purpose in a game by controlling a computer environment based on performance, pervious actions, and current intent of the user.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A strategy guide method performed by an artificial intelligence (AI)-based strategy guide system for an online game, the method comprising:
    generating an online game environment that interacts with a user;
    in response to an action of the user, transiting the online game environment from one state to another state based on a transition probability and displaying the one state and the another state to the user; and
    controlling an online game strategy of the user based on a preset multi-objectives by changing, in response to observing a decision making of the user in the online game environment, the online game environment to manipulate a prediction error for achieving a goal of the user, wherein the prediction error comprises a reward prediction error of the user and a state prediction error of the user, and the reward prediction error and the state prediction error are signals observed from a brain of the user,
    wherein the controlling of the online game strategy of the user comprises
    setting an objective function relating to a reward predicting error and a state predicting error,
    determining whether the reward prediction error and the state prediction error of the user satisfy the objective function, and
    terminating a process in response to the reward prediction error and the state prediction error of the user satisfying the objective function, and verifying a current online game environmental state and a prediction error state of the user in response to the reward prediction error and the state prediction error of the user not satisfying the objective function.

2. The method of claim 1, wherein the controlling of the online game strategy of the user comprises determining an environmental change based on the decision making of the user observed in the environment.

3. The method of claim 2, wherein the objective function further relates to a reinforcement learning signal and characteristic observed in basal ganglia of the user.

4. The method of claim 3, wherein the controlling of the online game strategy of the user comprises:
    detecting the environmental change based on the decision making of the user observed in the environment.

5. The method of claim 4, wherein the controlling of the online game strategy of the user comprises:
    performing an online game strategy for achieving the goal of the user in the online game environment that is changed in response to detecting the environmental change, and determining whether the prediction error according to the performed online game strategy satisfies the objective function.

6. The method of claim 1, wherein the controlling of the online game strategy of the user comprises:
    changing an environmental setting for inducing an online game strategy required in the verified current online game environmental state.

7. The method of claim 5, wherein the controlling of the online game strategy of the user comprises:
    determining whether the decision making of the user satisfies the objective function in response to not detecting the environmental change, and terminating a process in response to the decision making of the user satisfying the objective function, and changing an environmental setting for inducing an online game strategy required in the online game environment in response to the decision making of the user not satisfying the objective function.

8. The method of claim 1, wherein the objective function is defined to minimize at least one of the reward prediction error or the state prediction error to activate a reinforcement learning.

9. A strategy guide system for an online game using artificial intelligence (AI), the strategy guide system comprising at least one processor configured to:
    generate an online game environment that interacts with a user;
    in response to an action of the user, transit the online game environment from one state to another state based on a transition probability and display the one state and the another state to the user; and
    control an online game strategy of the user based on a preset multi-objectives by changing, in response to observing a decision making of the user in the online game environment, the online game environment to manipulate a prediction error for achieving a goal of the user, wherein the prediction error comprises a reward prediction error of the user and a state prediction error of the user, and the reward prediction error and the state prediction error are signals observed from a brain of the user, wherein in controlling the online game strategy of the user, the at least one processor is configured to:
    set an objective function relating to a reward predicting error and a state predicting error, determine whether the reward prediction error and the state prediction error of the user satisfy the objective function, and terminate a process in response to the reward prediction error and the state prediction error of the user satisfying the objective function, and verify a current online game environmental state and a prediction error state of the user in response to the reward prediction error and the state prediction error of the user not satisfying the objective function.

10. The strategy guide system of claim 9, wherein the at least one processor is configured to determine an environmental change based on the decision making of the user observed in the environment.

11. The strategy guide system of claim 10, wherein the objective function further relates to a reinforcement learning signal and characteristic observed in basal ganglia of the user.

12. The strategy guide system of claim 11, wherein the at least one processor is configured to detect the environmental change based on the decision making of the user in the environment.

13. The strategy guide system of claim 12, wherein the at least one processor is configured to perform an online game strategy for achieving the goal of the user in the online game environment that is changed in response to detecting the environmental change, and to determine whether the prediction error according to the performed online game strategy satisfies the objective function.

14. The strategy guide system of claim 9, wherein the at least one processor is configured to change an environmental setting for inducing an online game strategy required in the verified current online game environmental state.

15. The strategy guide system of claim 13, wherein the at least one processor is configured to determine whether the decision making of the user satisfies the objective function in response to not detecting the environmental change, and to terminate a process in response to the decision making of the user satisfying the objective function, and to change an environmental setting for inducing an online game strategy required in the online game environment in response to the prediction error of the user not satisfying the objective function.

16. The method of claim 1, wherein the controlling of the online game strategy of the user comprises deterministically or probabilistically changing the transition probability.

17. The strategy guide system of claim 9, wherein in controlling of the online game strategy of the user, the at least one processor is configured to deterministically or probabilistically change the transition probability.

18. The strategy guide system of claim 9, wherein the objective function is defined to minimize at least one of the reward prediction error or the state prediction error to activate a reinforcement learning.

* * * * *